United States Patent
Guo et al.

(10) Patent No.: US 7,331,053 B2
(45) Date of Patent: Feb. 12, 2008

(54) OPTICAL DISC DRIVE ENCLOSURE

(75) Inventors: Bin-Hai Guo, Shenzhen (CN);
Chien-Ting Lo, Tucheng (TW);
Li-Ming Wan, Shenzhen (CN)

(73) Assignees: Hong Fu Jin Precision Industry (Shenzhen) Co., Ltd., Bao-an District, Shenzhen, Guangdong Provience (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 125 days.

(21) Appl. No.: 11/212,336

(22) Filed: Aug. 26, 2005

(65) Prior Publication Data

US 2006/0064706 A1    Mar. 23, 2006

(30) Foreign Application Priority Data

Aug. 28, 2004   (CN)  ............... 2004 2 00835652 U

(51) Int. Cl.
*G11B 33/02* (2006.01)

(52) U.S. Cl. .................................... 720/600
(58) Field of Classification Search ............... 720/600, 720/655, 657, 646, 601; 360/137; 369/75.1, 369/13.12; 361/679, 685
See application file for complete search history.

(56) References Cited

U.S. PATENT DOCUMENTS

| | | | | |
|---|---|---|---|---|
| 4,533,966 A | * | 8/1985 | Kume | ............... 360/96.5 |
| 5,355,357 A | * | 10/1994 | Yamamori et al. | .......... 720/646 |
| 5,953,188 A | * | 9/1999 | Higuchi et al. | ............. 360/137 |
| 5,995,363 A | * | 11/1999 | Wu | ............................. 361/679 |
| 6,061,204 A | | 5/2000 | Tong | |
| 6,094,323 A | | 7/2000 | Tong | |
| 6,407,971 B1 | * | 6/2002 | Kojima | ....................... 720/657 |
| 6,804,174 B1 | * | 10/2004 | Kurita et al. | ............. 369/13.12 |
| 6,971,111 B2 | * | 11/2005 | Chuang et al. | ............. 720/601 |
| 2003/0107971 A1 | * | 6/2003 | Shepherd et al. | .......... 369/75.1 |
| 2004/0076102 A1 | * | 4/2004 | Huang | ........................ 369/75.1 |
| 2005/0050566 A1 | * | 3/2005 | Zheng | ........................ 720/655 |

FOREIGN PATENT DOCUMENTS

CN          02130273.1          2/2004

* cited by examiner

*Primary Examiner*—Tianjie Chen
(74) *Attorney, Agent, or Firm*—Morris Manning Martin LLP; Tim Tingkang Xia, Esq.

(57) ABSTRACT

An optical disc drive enclosure for enclosing an optical disc drive, the optical disc drive enclosure comprises a cover and a panel. The cover comprises a top wall with at least one catch formed on a lower surface of the top wall. The panel is secured to a front of the cover, and comprises at least one fastener formed on a top thereof. The fastener defines a hole with the catch being latchingly engaged therein.

13 Claims, 4 Drawing Sheets

OPTICAL DISC DRIVE ENCLOSURE

BACKGROUND

1. Field of the Invention

The present invention generally relates to optical disc drive enclosures, and particularly to an optical disc drive enclosure for a front-loading optical disc drive.

2. Related Art

An optical disc drive has become a standard feature of a personal computer system, for recording information and/or playing music and/or video recordings. Various optical discs usable in such optical disc drives include CD-ROMs (Compact Disc Read Only Memory discs), CD-RWs (Compact Disc Rewritable discs), DVD-ROMs (Digital Versatile Disc Read Only Memory discs), etc.

A typical optical disc drive module ("disc drive") mainly includes a tray for receiving and carrying an optical disc, a spindle motor for rotating the optical disc, a pickup unit for reading information contained in the optical disc, and a frame for supporting the above-mentioned components. The disc drive is completely received in an optical disc drive enclosure. A conventional disc drive enclosure includes an upper cover, a lower cover, and a front panel. The assembled upper cover, lower cover, and front panel cooperatively define an inner space. The disc drive is received in the inner space. The front panel is generally formed of a plastic material. The front panel defines an opening for allowing a tray to extend out therethrough. A tray panel is engaged in the opening. A slot is formed at a back of the front panel, between the tray panel and a top edge of the front panel. The front panel is mechanically coupled to the upper cover.

However, the above-described disc drive assembly has some problems. The most serious of these problems stems from the rapid development of information technology, which has promoted the advancement of the technology of optical disc drives. One important advancement is that the driving speed of optical disc drives is becoming faster and faster.

In the above-described disc drive, the disc is loaded on a tapered portion of a spindle motor, and the disc is then held on the spindle motor by a magnetic clamp. Only a small portion of the disc around a center hole contacts the tapered portion of the spindle motor. At high drive speeds, internal stresses are concentrated around the center hole portion of the disc. The internal stresses may cause the disc to crack or shatter. This is particularly the case for inferior quality optical discs. Debris of the cracked disc may strike and damage the tray panel. The debris may even cause the tray panel to disengage from the front panel, whereby the debris may spatter out from the front panel and injure a user.

Therefore, a heretofore unaddressed need exists in the industry to address the aforementioned deficiencies and inadequacies.

SUMMARY

Briefly described, one embodiment of the disc drive enclosure, among others, can be implemented as described herein.

An optical disc drive enclosure for enclosing an optical disc drive, the optical disc drive enclosure comprises a cover and a panel. The cover comprises a top wall with at least one catch formed on a lower surface of the top wall. The panel is secured to a front of the cover, and comprises at least one fastener formed on a top thereof. The fastener defines a hole with the catch being latchingly engaged therein.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF PREFERRED EMBODIMENTS

Figure 1:
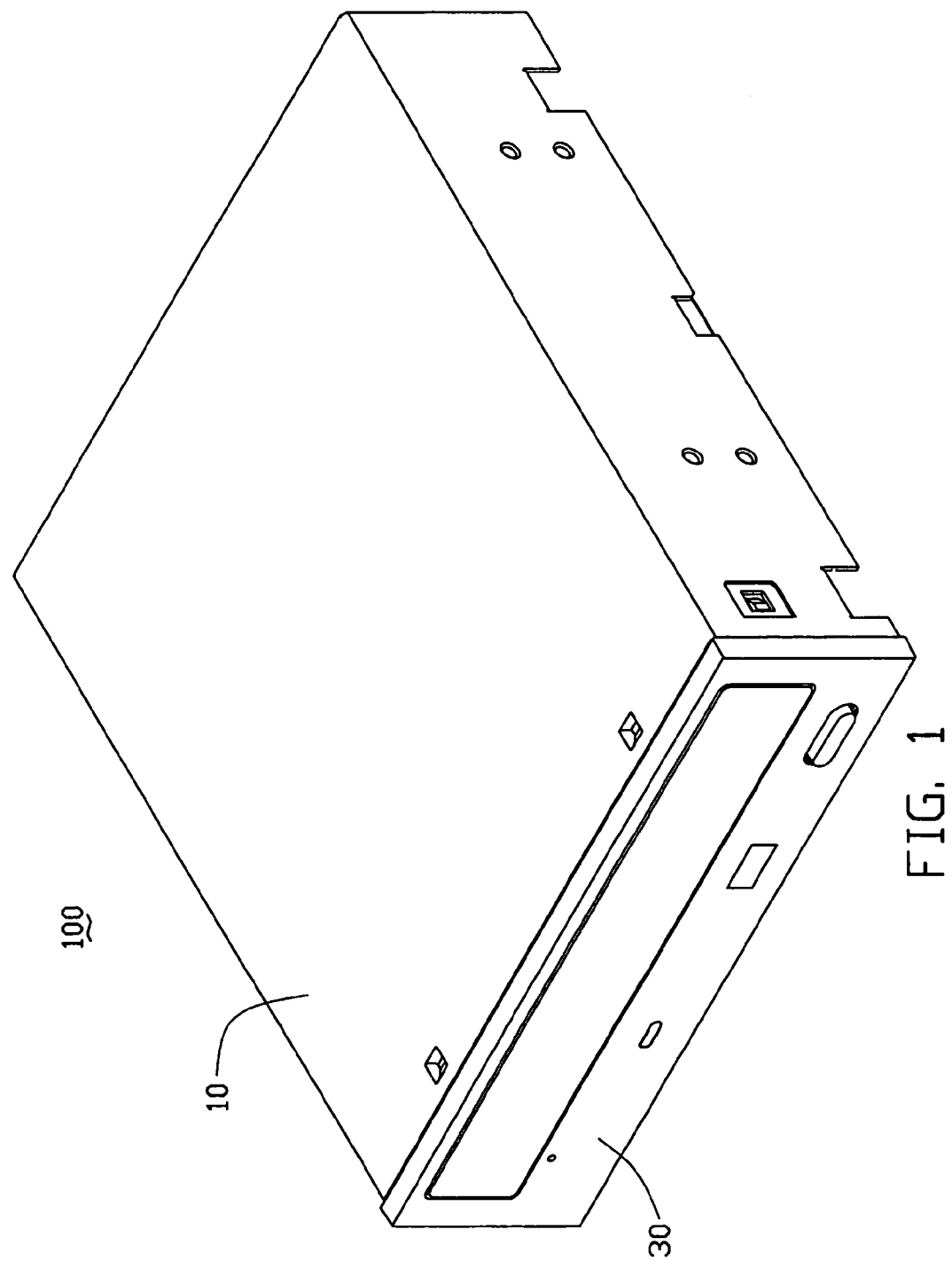
FIG. 1 is an isometric view of an optical disc drive enclosure in accordance with an exemplary embodiment of the present invention.

Reference will now be made to the drawing figures to describe the preferred embodiments of the present invention in detail.

As shown in FIG. 1, an optical disc drive enclosure 100 for receiving an optical disc drive module (not shown) in accordance with an embodiment of the present invention includes a cover 10, and a panel 30 fastened to a front of the cover 10. The cover 10 is for covering various internal mechanisms such as optical disc drive modules (not shown) and PCBs (Printed Circuit Boards, not shown) of the optical disc drive modules. Preferably, the cover 10 is formed of a single metal sheet by a punching process. Alternatively, the panel 30 can be made of a plastic material by an injection molding process.

Figure 2:
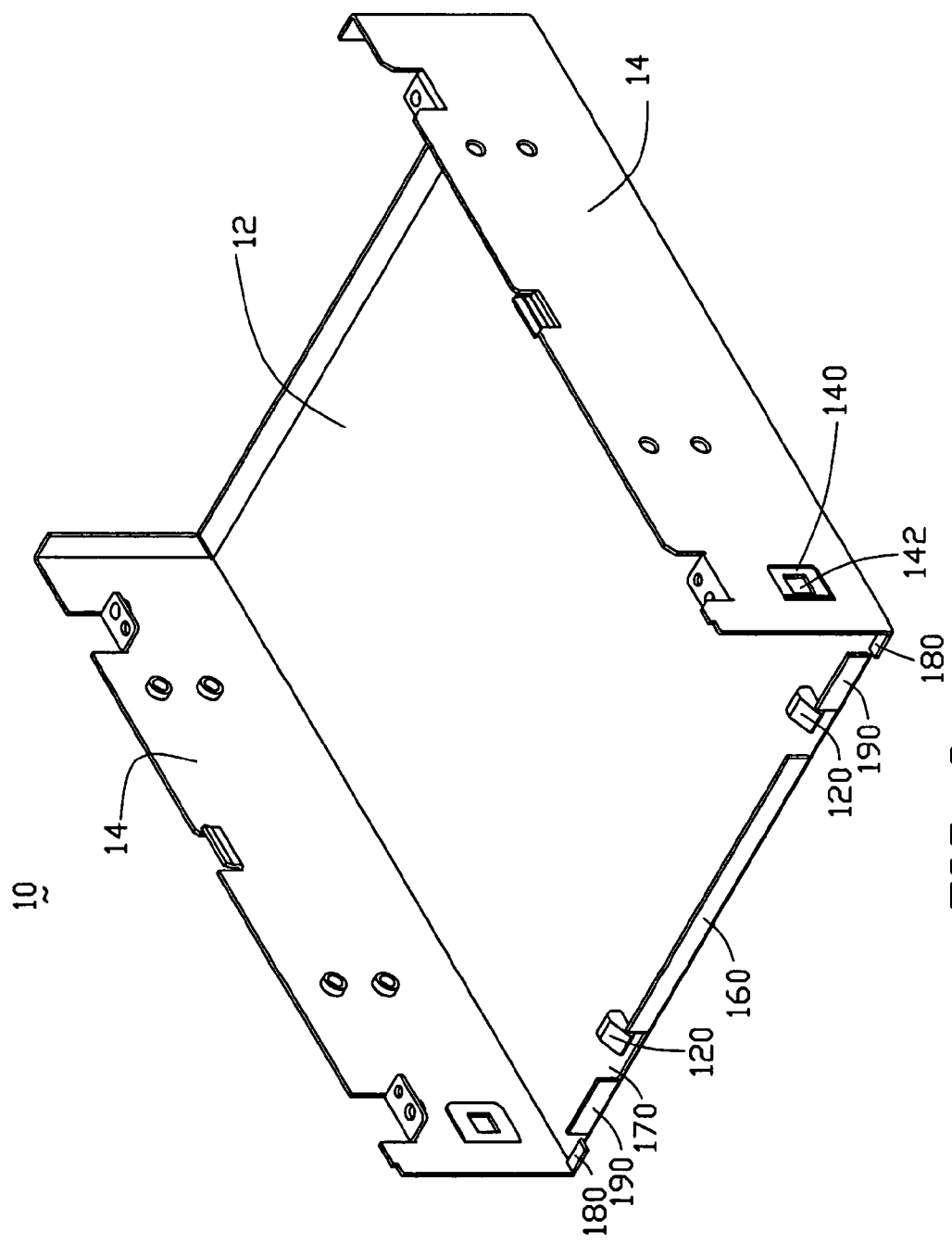
FIG. 2 is an isometric view of a cover of the disc drive enclosure of FIG. 1, viewed from a bottom aspect.

Referring to FIG. 2, the cover 10 includes a horizontal top wall 12, two parallel side walls 14 respectively depending from opposite lateral sides of the top wall 12, and a bottom wall (not shown) attached to the side walls 14.

An extension of the top wall 12, including a first blocking hem portion 160 and a pair of second blocking hem portions 190, depends from a front edge (not labeled) of the top wall 12. The first and second blocking hem portions 160, 190 are for blocking debris of a cracked disc from coming out of the enclosure 100 in the event of a spinning disc cracking. The first blocking hem portion 160 and the second blocking hem portions 190 are interspaced by a pair of cutouts 170. A pair of catches 120 is respectively formed on an inner surface (not labeled) of the top wall 12, spatially corresponding to the pair of cutouts 170. Each catch 120 has a slanted portion (not labeled) slanted toward the corresponding cutout 170. Another extension of the top wall 12, including a pair of opposite tabs 180, extends from edge portions (not labeled) of the top wall 12 adjacent the side walls 14. A recess 140 with a hole 142 defined therein is defined in each side wall 14.

Figure 3:
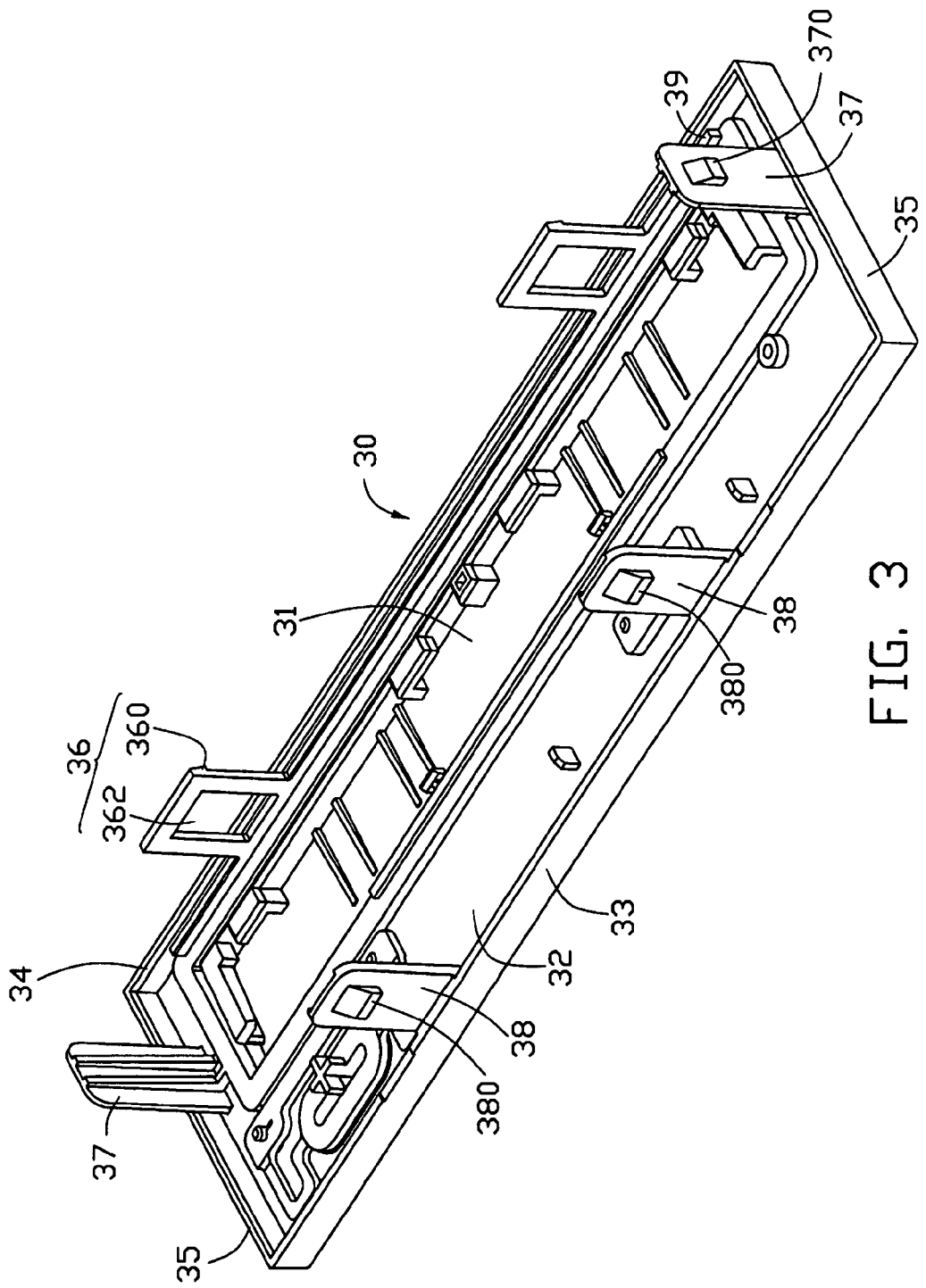
FIG. 3 is an enlarged, isometric view of a panel of the disc drive enclosure of FIG. 1, viewed from another aspect.

Now referring to FIG. 3, an enlarged, rear view of the panel 30 is illustrated. The panel 30 includes a substantially rectangular main plate 32. A width of the main plate 32 is substantially equal to a width of the top wall 12. A height of the main plate 32 is substantially equal to a height of each side wall 14. A tray opening (not labeled) is defined in the main plate 32, for a tray (not shown) of the optical disc drive to extend out therethrough. A tray panel 31 is engaged in the tray opening. A bottom flange 33, a top flange 34, and a pair of side flanges 35 are respectively formed on the main plate 32, extending rearward from a bottom edge, a top edge, and side edges of the main plate 32 respectively. The flanges 33, 34, 35 are interconnected with each other.

A pair of bottom arms 38 with bottom catches 380 formed thereon extends rearward from the main plate 32 of the panel 30, adjacent the bottom flange 33. A side arm 37 with a side catch 370 formed thereon extends rearward from the main plate 32 of the panel 30, adjacent the side flanges 35. A distance between the bottom arms 38 is equal to a distance between a pair of bottom holes defined in a bottom wall (not shown) of the cover 10. A rear portion of each of the bottom and side catches 380, 370 is slanted. A plurality of strengthening ribs (not labeled) is formed at a back of each side arm 37 and each bottom arm 38.

Similar to the bottom arms 38, a pair of fasteners 36, as an extension of the panel, extends rearward from a strip 39 formed on the back of the main plate 32. Each fastener 36 includes a sloping portion 360 at a distal end thereof, and an opening 362 defined in a center thereof. The location of the openings 362 of the fasteners 36 correspond to the catches 120 of the cover 10. Each of the sloping portions 360 is slanted rearward. The strip 39 is parallel to and spaced from the top flange 34. A slot (not labeled) is defined between the top flange 34 and the strip 39. In an alternative embodiment, a plurality of strengthening ribs is formed on each fastener 36, opposite from the corresponding sloping portion 360.

During assembly, the bottom wall is attached to the side walls 14 by fastening means such as screws. Then, the panel 30 is pressed to engage with a front portion of the cover 10. During this process, the side arms 37 and the bottom arms 38 are deformed inward. The side catches 370 and the bottom catches 380 gradually slide into the side holes 142 and the bottom holes. Meanwhile, the fasteners 36 are deformed inward. The sloping portions 360 of the fasteners 26 slide along the slanted portions of the catches 120 respectively, whereupon the catches 120 of the top wall 12 are latchingly engaged in the openings 362 of the fasteners 36. Thus, the panel 30 is firmly fixed to the cover 10.

Figure 4:
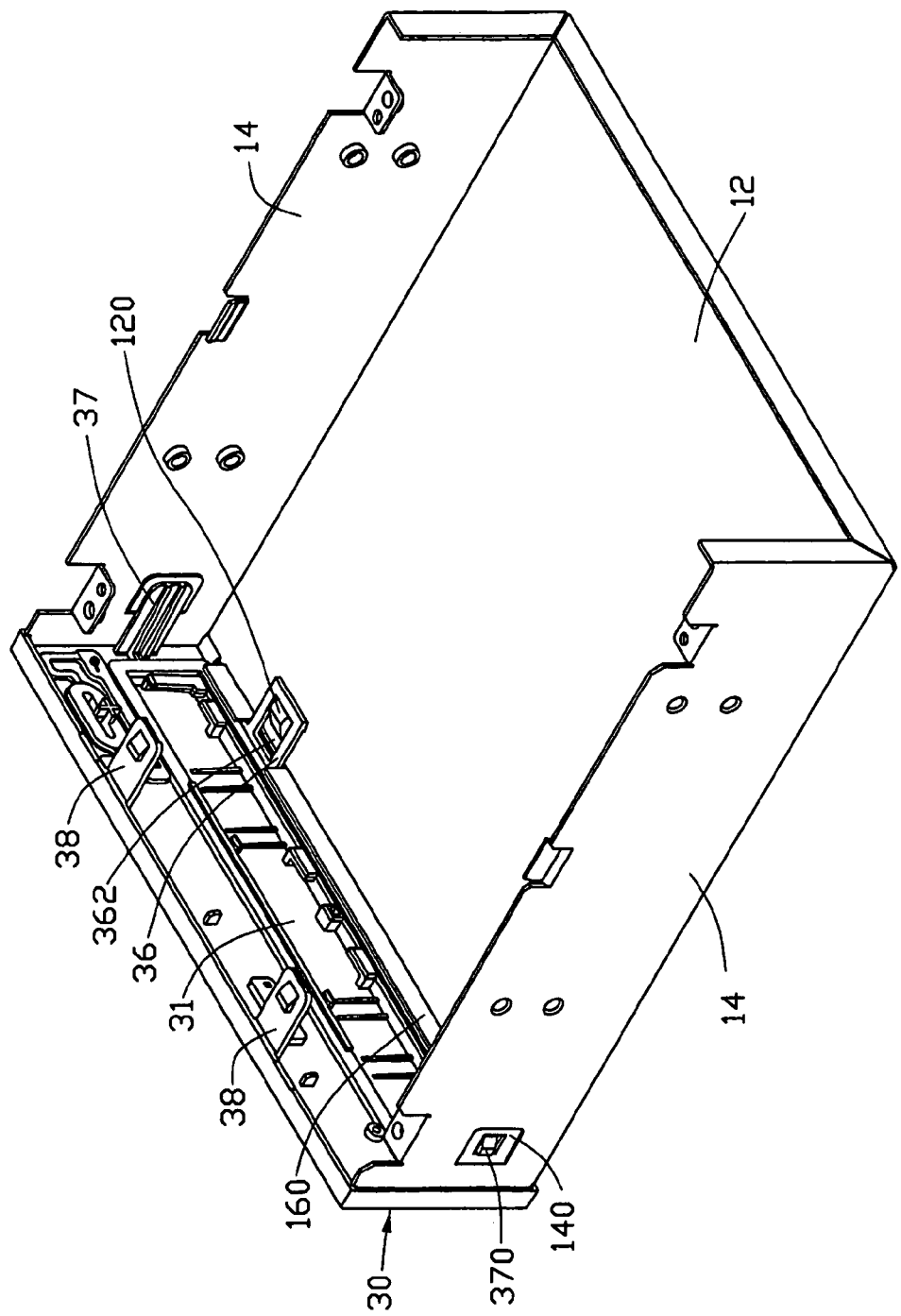
FIG. 4 is similar to FIG. 1, but viewed from a bottom aspect and without showing a bottom wall of the cover of the disc drive enclosure.

Also referring to FIG. 4, in assembly, the bottom arms 38 are securely engaged with the bottom wall, with the bottom catches latchingly engaged in the bottom holes defined in the bottom wall. The side arms 37 are securely engaged with the side walls 14, with the side catches latchingly engaged in the holes 142. The fasteners 36 are securely engaged with the top wall 12, with the catches 120 latchingly engaged in the openings 362 thereof. The tabs 180 abut against the main plate of the panel 30, covering corresponding portions of the slot defined between the top flange 34 and the strip 39.

When a disc is rotated in the optical disc drive at high speed, internal stresses are concentrated in the disc around a center hole thereof. This may cause severe cracking or even shattering of the disk. In the illustrated embodiment, by means of the fastener on the panel, the panel is securely attached to the top wall of the cover. Therefore, disengagement of the panel from the cover due to scattering debris can be avoided. In addition, because the bottom edges of the first and second hems 160, 190 are substantially flush with the top of the tray opening of the panel 30, scattering debris flying toward the panel 30 can be completely blocked by the first and second metal blocking hem portions 160, 190. Thus, the debris does not directly impact the plastic panel 30. Any injury to a user due to scattering debris can be completely avoided.

It should be emphasized that the above-described embodiments, including any preferred embodiments, are merely possible examples of implementation of the principles of the invention, and are merely set forth for a clear understanding of the principles of the invention. Many variations and modifications may be made to the above-described embodiments without departing substantially from the spirit and principles of the invention. All such modifications and variations are intended to be included herein within the scope of this disclosure and the present invention and be protected by the following claims.

What is claimed is:

1. An optical disc drive enclosure for enclosing an optical disc drive, the optical disc drive enclosure comprising:
   a cover comprising a top wall with at least one catch formed on a lower surface of the top wall and at least one blocking hem portion perpendicularly extending downward from a front edge of the top wall; and
   a panel secured to a front of the cover, the panel comprising at least one fastener formed on a top part of the panel, the fastener defining a hole with a catch being latchingly engaged therein, the top part of the panel being supported by the at least one hem portion, thus direct impacts on the panel from internal components of the enclosure being blocked by the at least one blocking hem portion;
   wherein the panel defines an opening therein, with a bottom edge of the at least one hem being substantially flush with a top extremity of the opening.

2. The optical disc drive enclosure according to claim 1, wherein a pair of tabs extends from the front edge of the top wall and abuts against the panel.

3. The optical disc drive enclosure according to claim 2, wherein the at least one catch is two catches, and each of the catches comprises a slanted portion slanted toward the panel.

4. The optical disc drive enclosure according to claim 3, wherein the at least one blocking hem portion defines two cutouts spatially corresponding to the wedges.

5. The optical disc drive enclosure according to claim 4, wherein the at least one blocking hem portion is three blocking hem portions, and the three blocking hem portions are interspaced from each other by the two cutouts.

6. The optical disc drive enclosure according to claim 5, wherein a plurality of arms extends rearward from lateral sides and a bottom edge of the panel.

7. The optical disc drive enclosure according to claim 6, wherein a catch is formed at a distal end of each arm, the catches being for engaging in corresponding holes defined in two side walls and a bottom wall of the cover.

8. The optical disc drive enclosure according to claim 7, wherein a plurality of ribs is formed on each of the fastener and arms.

9. An optical disc drive comprising:
   a cover for receiving a disc drive unit therein, the cover comprising:
   a top wall comprising a blocking hem portion extending substantially perpendicularly downward from a front edge thereof and at least one cutout defined in the blocking hem portion, and at least one first latching portion correspondingly arranged adjacent the at least one cutout, wherein the first latching portion comprises a catch formed at a lower surface of the top wall;

two side walls extending from opposite sides of the top wall; and a bottom wall attached to the side walls;

wherein the top wall, side walls, and bottom wall cooperatively form a front opening; and a panel secured to the front opening of the cover, the panel comprising:

at least one second engaging portion arranged at a top of the panel, wherein the second engaging portion defines a hole therein, the catch of the first latching portion is securely engaged in the hole of the second engaging portion through the at least one cutout, and a slanted portion is formed at a distal end of the second engaging portion; and an opening defined in the panel to expose internal components of the disc drive;

wherein a top extremity of the opening of the panel is substantially flush with a bottom of the blocking hem portion of the cover.

10. The optical disc drive according to claim 9, wherein a pair of tabs extends from the top wall and abuts against the panel.

11. The optical disc drive according to claim 9, wherein a plurality of arms extends from lateral sides and a bottom of the panel, the arms being adapted to fasten the panel to the side walls and the bottom wall of the cover.

12. An optical disc drive comprising:

means for performing functions of said optical disc drive;

a cover abutting against at least one side of said optical disc drive to shield said means of said optical disc drive from said at least one side thereof, said cover comprising at least two first extensions formed from an edge of said cover; and a panel abutting against another side of said optical disc drive neighboring said edge of said cover to shield said means of said optical disc drive from said another side thereof, and capable of providing an access to said means of said optical disc drive, said panel comprising a second extension formed toward said edge of said cover and engagable therewith, said second extension of said panel, cooperating with said at least two first extensions of said cover and capable of blocking any access to clearance between said panel and said edge of said cover;

wherein said at least two first extensions said cover comprise a first blocking hem portion and a pair of second blocking hem portions extending from said edge of said cover along one direction, and a pair of tabs extending from said edge of said cover along another direction.

13. The optical disc drive according to claim 12, wherein said second extension of said panel comprises a pair of fasteners extending toward said edge of said cover respectively to engage with a corresponding catch formed from said cover.

* * * * *